United States Patent [19]

Algers

[11] Patent Number: 4,900,335
[45] Date of Patent: Feb. 13, 1990

[54] CENTRIFUGAL PUMP WHEEL AND METHOD OF PUMPING GAS CONTAINING LIQUID BY MEANS OF A CENTRIFUGAL PUMP

[75] Inventor: Bengt Algers, Kvarndalen, Sweden

[73] Assignee: Scanpump AB, Molndal, Sweden

[21] Appl. No.: 241,042

[22] Filed: Sep. 6, 1988

[30] Foreign Application Priority Data

Sep. 3, 1987 [SE] Sweden .................................. 8703426

[51] Int. Cl.$^4$ ............................................. B01D 19/00
[52] U.S. Cl. ........................................... 55/21; 55/52; 55/199; 55/203; 55/408
[58] Field of Search .................. 55/21, 52, 55, 163, 55/190, 199, 203, 408, 409; 162/83; 415/121 A, 168; 416/181

[56] References Cited

U.S. PATENT DOCUMENTS

| | | |
|---|---|---|
| 2,575,568 | 11/1951 | Topanelian, Jr. ...................... 55/199 |
| 3,999,889 | 12/1976 | Caulk et al. ........................... 416/181 |
| 4,201,555 | 5/1980 | Tkach .................................. 55/21 X |
| 4,410,337 | 10/1983 | Gullichsen et al. ..................... 55/21 |
| 4,435,193 | 3/1984 | Gullichsen et al. ..................... 55/21 |
| 4,776,758 | 10/1988 | Gullichsen ........................... 415/168 |

OTHER PUBLICATIONS

Ahlstrom Mc-Pumps' Brochure—Finland—1987.

Primary Examiner—Charles Hart
Attorney, Agent, or Firm—Cushman, Darby & Cushman

[57] ABSTRACT

A centrifugal pump wheel (4) comprises a rear (6) and-/or a front (9) covering plate or dish, which has a plurality of gas evacuation openings (8) located leeward of the pump wheel vanes (5). To increase the effectivity of the gas evacuation and thereby improve the performance characteristics of the pump that fraction of the area of the openings which is located nearer the circumference of the pump wheel than the center of the pump wheel has been made larger than the remaining portion of the area of the openings.

The invention also relates to a method of pumping a liquid which contains gas and possibly also solids, by means of a centrifugal pump having a pump wheel with the above characteristics. The gas pressure in a conduit (12) which is in communication with said openings (8) is measured. The measured value is compared with the liquid pressure in the pump inlet, and the pressure difference between said pressures is utilized to control a valve (13) in said conduit in such a manner that said pressure difference and/or the difference between the pressure in the pump inlet (2) and the pump outlet (3) is maintained within pre-determined limits.

13 Claims, 6 Drawing Sheets

A - 0% air
B - 11% air
C - 20% air

I  Conventional pump without apertures in the pump wheel
II  Known pump ("Ahlstar")
III  The pump according to the invention

CENTRIFUGAL PUMP WHEEL AND METHOD OF PUMPING GAS CONTAINING LIQUID BY MEANS OF A CENTRIFUGAL PUMP

BACKGROUND OF THE INVENTION

This invention relates to a centrifugal pump wheel of that type which is generally comprised of a centrifugal pump wheel having at least one covering plate or disk, a plurality of pump wheel vanes and gas evacuation openings located leeward of respective vanes of the pump wheel, as well as to a method of pumping a liquid which contains gas and possibly also solids, particularly paper pulp, by means of a centrifugal pump.

It is known in the art that centrifugal pumps get substantially deteriorated performance characteristics when the pumping of liquids containing free gases is concerned. In pumping of gas containing water the pump can operate with a gas content of about 10–15%, however with substantially less satisfactory performance characteristics than at the pumping of clean water. This is evident from the diagram in FIG. 1.

In some suspensions which beside gas contain solids, such as paper pulp, the pump action ceases completely at an air content of about 5%, as is evident from the diagram in FIG. 2.

To improve the performing characteristics of pumps intended for the pumping of paper pulp and the like one has therefore evacuated gases from the pump fluid through an aperture or a conduit behind the pump wheel. To make this evacuation of gas more effective the pump wheel additionally has been provided with holes. In the belief that primarily the heavier mixture of liquid and solids would be thrown radially outwards in the direction towards the circumference of the pump wheel by the centrifugal force, whereas the gas would be collected more centrally, the major part of these gas evacuation openings has hitherto always been located adjacent the centre of the pump wheel.

SUMMARY OF THE INVENTION

Quite surprisingly we have now found that a substantially better air evacuation and thereby substantially improved operation characteristics of the pump can be obtained, as is apparent from the diagram according to FIG. 3, if the openings in the pump wheel are concentrated to the circumferential area thereof, and the pump wheel according to the invention is therefore comprised by a centrifugal pump wheel having at least one covering plate or disk, a plurality of pump wheel vanes, and gas evacuation openings located leeward of respective vanes of the pump wheel.

In concert herewith the method according to the invention is comprised of the following steps: evacuating at least the major portion of the gas through openings which are located adjacent the circumference of the pump wheel and are in communication with a conduit in which a valve is provided; measuring the gas pressure of the liquid in said conduit; measuring the liquid pressure in the pump inlet; comparing the measured value of the gas pressure with the liquid pressure in the pump inlet; and utilizing the pressure difference between said liquid pressure and said gas pressure for controlling said valve in said conduit in such a way that said pressure difference is maintained within predetermined limits.

BRIEF DESCRIPTION OF THE DRAWINGS

Further features and advantages of the pump wheel and the method according to the invention will become apparent from the following detailed description and the annexed drawings which diagrammatically and as non-limiting examples illustrate some preferred embodiments of the invention.

FIGS. 8, 11 and 14 are partial sectional views on the lines VIII—VIII, XI—XI and XIV—XIV in FIGS. 7, 10 and 13, respectively.

In all Figures one and the same reference numeral designates the same or similar details throughout.

DESCRIPTION OF THE PREFERRED EMBODIMENTS

Figure 1:
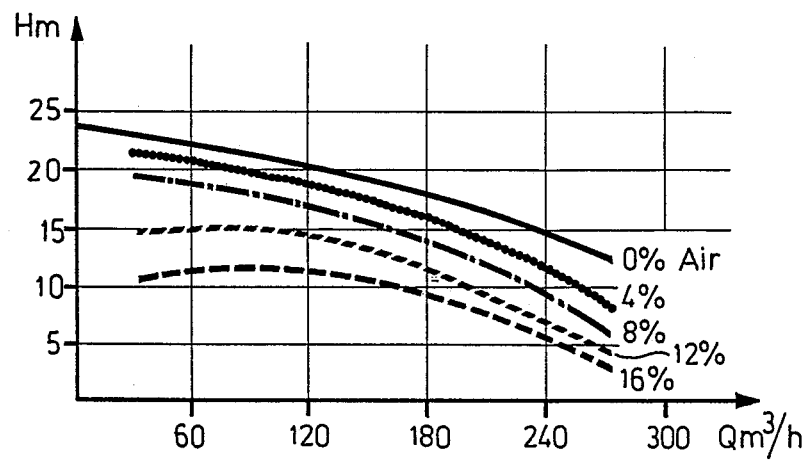
FIG. 1 is, as mentioned above, a diagram which discloses the relationship between lifting height and pump volume with gas contained in the pump fluid, which is here comprised of water, as parameter.
Figure 2:
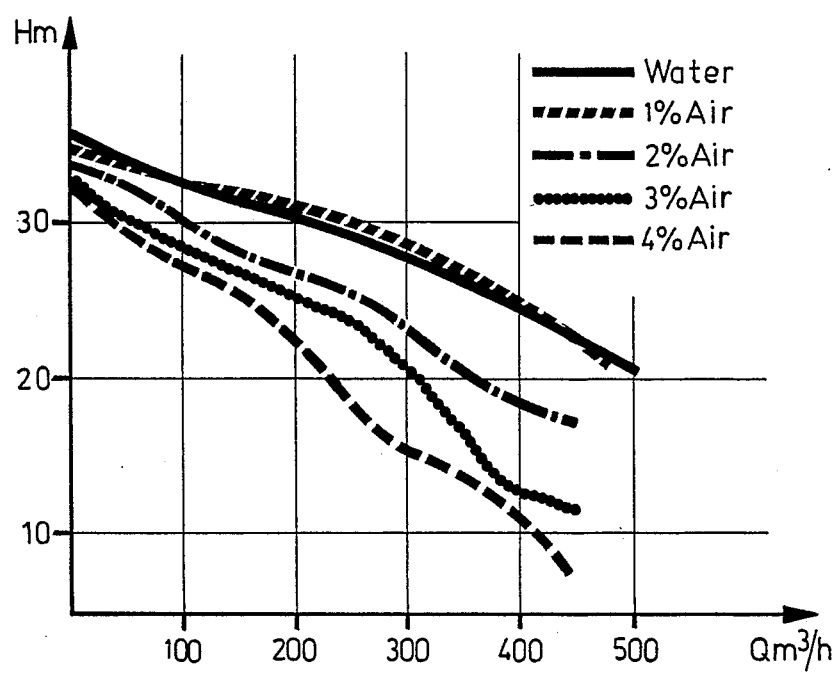
FIG. 2 is, as already mentioned, a diagram corresponding to FIG. 1, the pump fluid being paper pulp instead of water.
Figure 3:
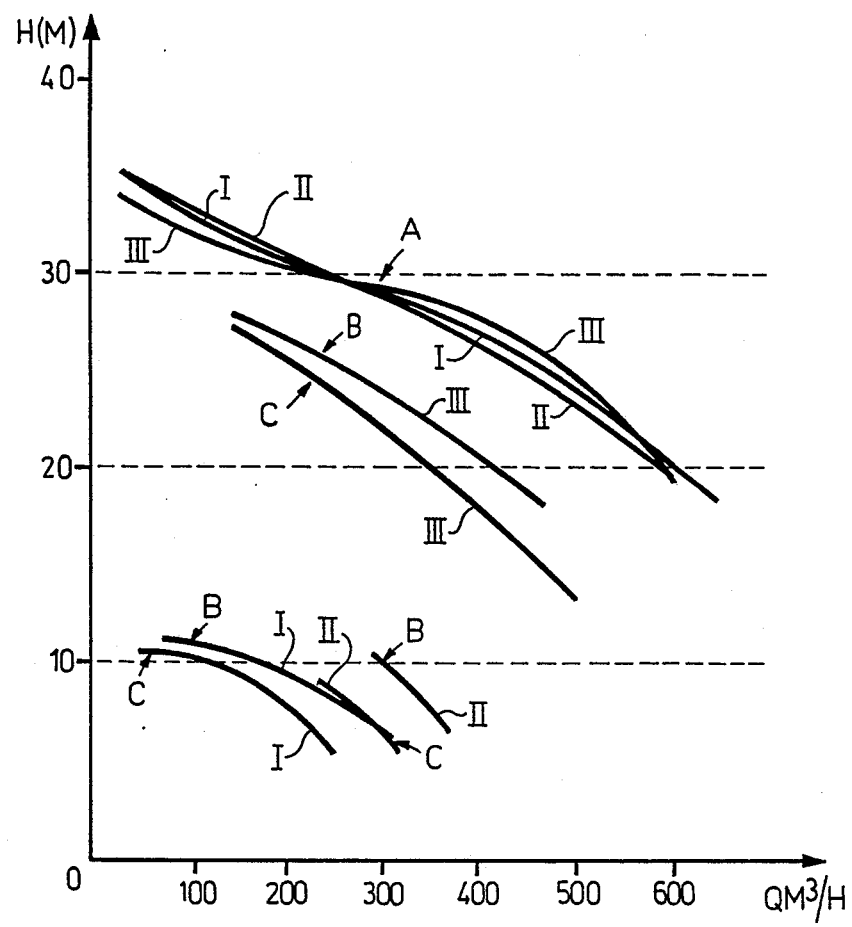
FIG. 3 is, as also has been apparent from the above, a diagram illustrating the relationship between lifting height and pump volume H=f (Q) for different pumps with the gas volume expressed in percent of the fluid quantity as parameter.
Figure 4:
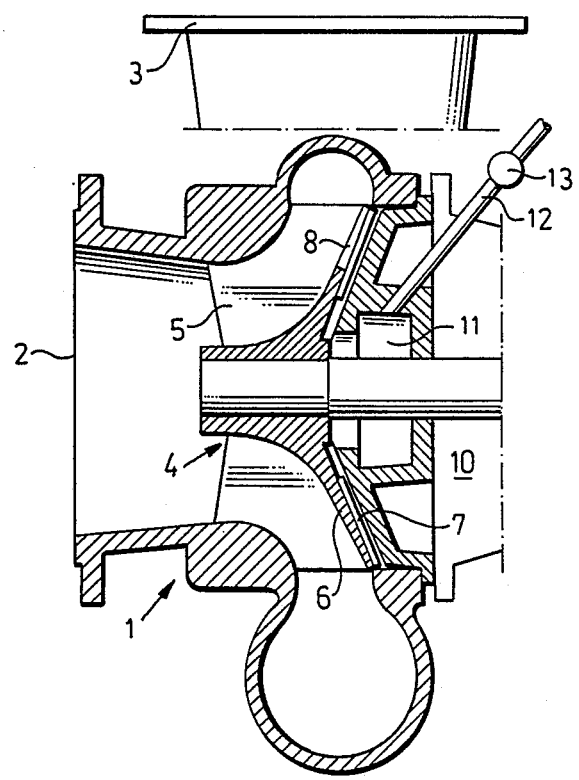
FIG. 4 is a plan view of a first embodiment of a pump wheel in accordance with the invention.
Figure 5:
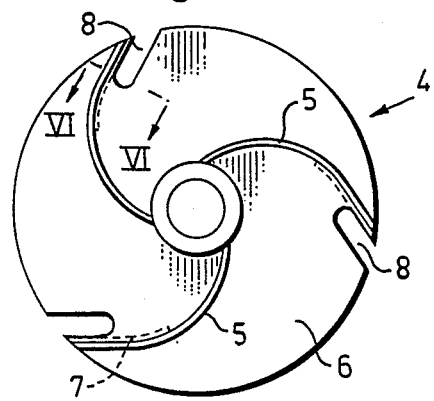
FIG. 5 is a partial sectional view on a larger scale on the line V—V in FIG. 4.
Figure 6:
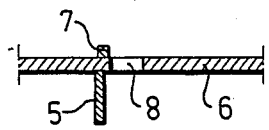
FIG. 6 is an axial sectional view of a pump comprising a pump wheel according to FIG. 4.

In FIGS. 4–6, 1 generally designates a pump housing having an inlet 2 and an outlet 3. 4 generaly designates a pump wheel comprising pump vanes 5, a rear covering plate 6 and back or rear vanes 7. Behind (inside) the pump wheel there is a pump housing cover 10 which seals the pump housing and comprises a space 11 which acts as a gas collecting chamber. Extending from the chamber out to the atmosphere is a gas conduit 12 in which a control valve 13 is provided.

To facilitate the evacuation of gas from the pump housing the covering plate or disk 6 of the pump wheel 4 is provided with air evacuation openings 8 which in accordance with the invention at least principally are located in the radially outer half of the cover plate or disk 6. In any case that fraction of the area of the openings which is located nearer the circumference of the pump wheel than the centre thereof is greater than the remaining portion of the area of the openings. In the exemplificatory embodiment the openings 8 are comprised of slits or slots which open into the circumference of the covering plate or disk 6. As is most clearly shown in FIG. 5 the slots 8 are located leeward of the pump vanes 5 and extend substantially parallel to that portion of a pump vane 5 which is located just opposite a respective slot. The slots 8 can be made comparatively large and therefore do not run the risk of being clogged in the same way as apertures.

Tests have indicated that the pump characteristic is better maintained with slots according to the invention than with centrally located apertures. Furthermore, the gas on the rear side may be taken away at a higher pressure, so that a vacuum pump is not required in most cases. The gas is better separated than with central apertures which facilitates further treatment of the gas, particularly returning or feeding back of liquid which has been separated from the separated gas. By adjusting the depth or length of the slots towards the centre of the pump wheel, gas pressure and extent of separation may be selected to fit different operation data.

As a supplement to, or instead of, the slots 8 the covering plate 6 may be provided leeward of each pump vane 5 with a plurality of through holes whose area increases with increasing radial distance between the centre of the pump wheel and the respective opening. Those back vanes 7 on the rear side of the covering plate or disk 6 which are each located just opposite a respective individual pump vane 5 do not only improve the hydraulic efficiency of the pump but do also make the separation of the gas from the liquid more efficient.

Figure 9:
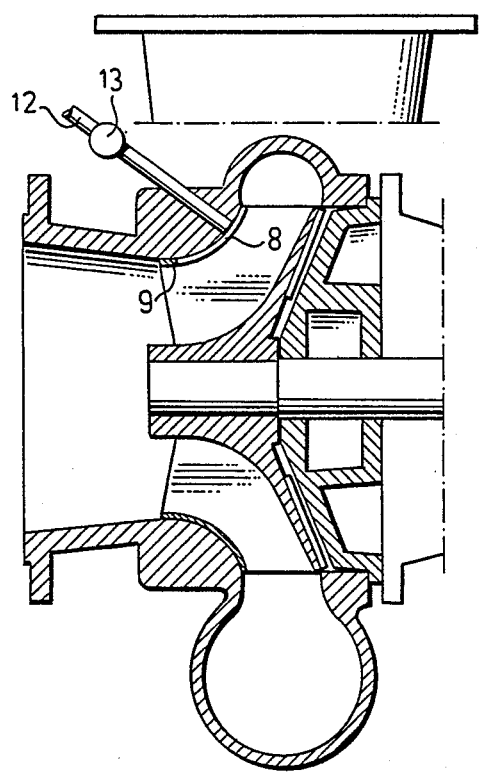
FIGS. 7–9, 10–12 and 13–15 are views corresponding to FIGS. 4, 5, 6, respectively, of a second, a third and a fourth embodiment of the invention, respectively.
Figure 7:
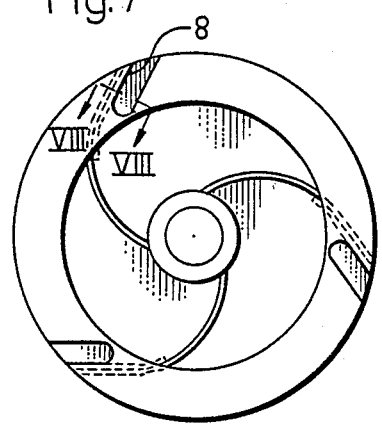
Figure 8:
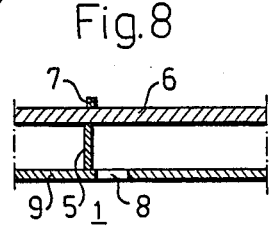
Figure 12:
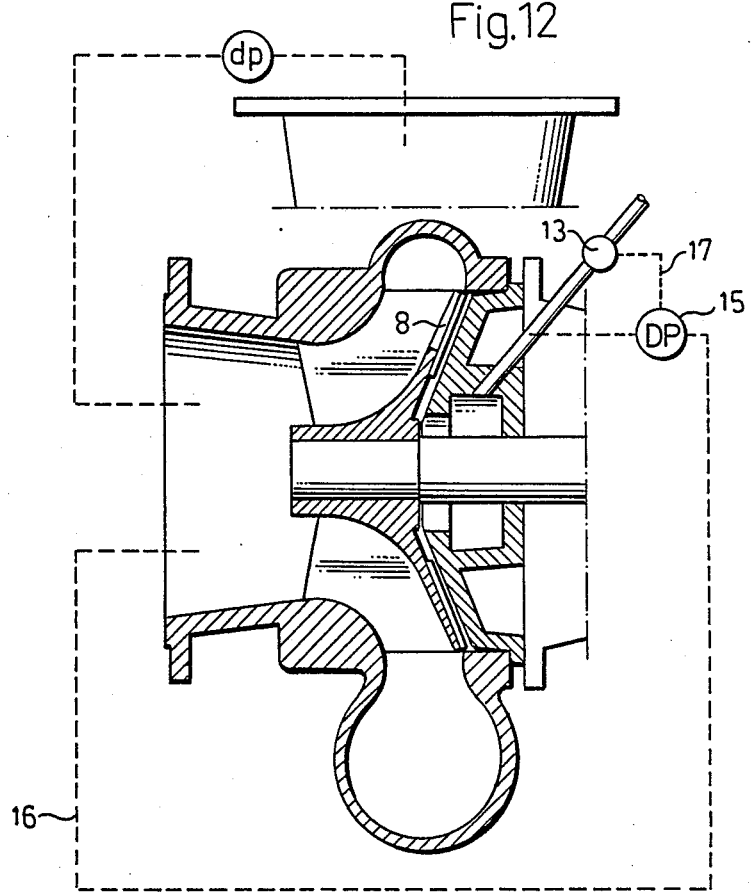
Figure 10:
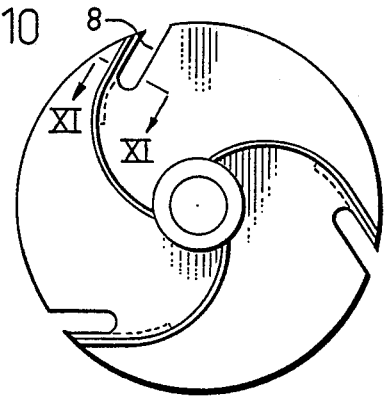
Figure 11:
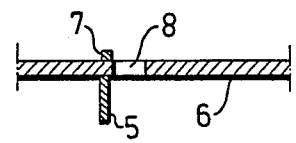
Figure 15:
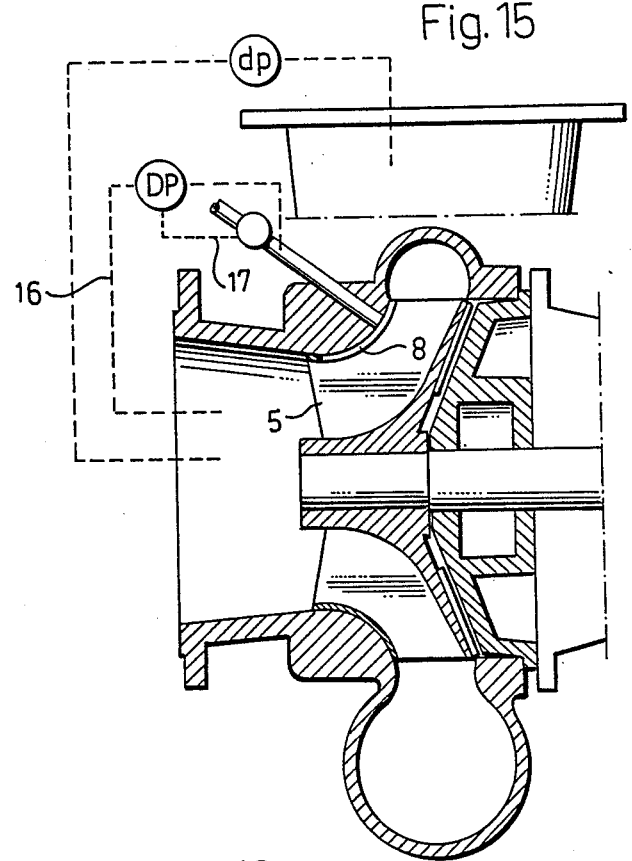
Figure 13:
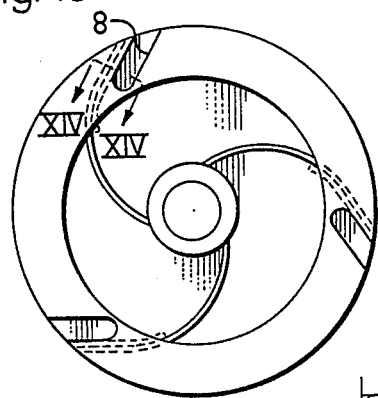
Figure 14:
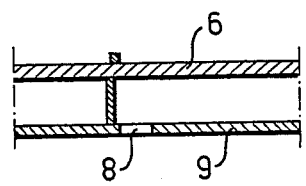

The embodiment according to FIGS. 7-9 distinguishes itself from that described above only therein, that the pump wheel 4 now in addition to the rear covering plate or disk 6 also has a front covering plate or disk 9. As a consequence hereof the inner opening of the gas conduit 12 has been displaced to a point just opposite the path of movement of the slots 8 in the passage between the pump housing 1 and the covering plate 9.

In the embodiments according to FIGS. 10-12 and 13-15, which correspond to the constructions according to FIGS. 4-6 and 7-9, respectively, the pump has been provided with control means indicated diagrammatically and incompletely. These means comprise a conventional difference pressure meter 15, which measures the pressure difference DP between the pressure in the inlet 2 of the pump, as is indicated by means of the dash line 16, and controls the valve 13 in the conduit 12, as is indicated by the dash line 17, and possibly also a vacuum pump (not shown) interconnected in the conduit 12, in such a way, that DP and/or the pressure difference dp between the inlet of the pump and the outlet of the pump is maintained within predetermined limits. Said control means, which are known per se, may be designed and operate in such a manner as is disclosed in US-A-4 410 337 and US-A-4 435 193.

The embodiments described above and illustrated in the drawings are, of course, to be regarded merely as non-limiting examples and may as to their details be modified in several ways within the scope of the following claims. In particular, new embodiments, which are also encompassed by the inventive concept, may be created by combining details which are taken from different ones of the exemplificatory embodiments described above.

What I claim is:

1. A centrifugal pump wheel comprising:
   a disk defining a covering plate having a center and a peripheral edge;
   a plurality of pump wheel vanes mounted to said covering plate; and
   a plurality of gas evacuation openings defined in said covering plate and located leeward of said vanes, at least the majority of said openings being comprised of longitudinal slots opening into the peripheral edge of the pump wheel disk.

2. A centrifugal pump wheel according to claim 1, wherein said covering plate is a rear covering plate.

3. A centrifugal pump wheel according to claim 1, wherein said covering plate is a front covering plate.

4. A centrifugal pump wheel according to claim 1, characterized by the provision of a rear covering plate as well as a front covering plate.

5. A centrifugal pump wheel according to claim 2, wherein all of the openings open towards the circumference of the respective covering plate.

6. A centrifugal pump wheel according to claim 5, wherein the longitudinal direction is substantial parallel to a pump wheel vane part which is located just opposite a slot.

7. A centrifugal pump wheel according to claim 1, wherein part of the openings are comprised of through holes in the pump wheel, said holes having an area which increases with increasing radial difference between the centre of the pump wheel and the respective hole.

8. A centrifugal pump wheel according to claim 2, wherein said openings are in communication with a space surrounding the pump wheel shaft and provided with a conduit for evacuation of the gas led away through the openings.

9. A centrifugal pump wheel according to claim 8, wherein said conduit is provided with a control valve.

10. A centrifugal pump wheel according to claim 3, characterized by the provision of a conduit for evacuating gas led away through said openings.

11. A centrifugal pump wheel according to claim 10, wherein said conduit is provided with a control valve.

12. A method of pumping a gas and solids containing liquid, particularly paper pulp, by means of a centrifugal pump having a pump inlet, comprising the steps of
   (a) evacuating at least the major portion of the gas through openings which open into the circumference of the pump wheel and are in communication with a conduit in which a valve is provided;
   (b) measuring the gas pressure of the liquid in said conduit;
   (c) measuring the liquid pressure in the pump inlet;
   (d) comparing the measured value of the gas pressure with the liquid pressure in the pump inlet;
   (e) utilizing the pressure difference between said liquid pressure and said gas pressure for controlling said valve in said conduit in such a way that said pressure difference is maintained within predetermined limits.

13. A method of pumping a gas and solids containing liquid, particularly paper pulp, by means of a centrifugal pump having a pump inlet, comprising the steps of
   (a) evacuating at least the major portion of the gas through openings which open into the circumference of the pump wheel and are in communication with a conduit in which a valve is provided;
   (b) measuring the liquid pressure in the pump inlet;
   (c) measuring the liquid pressure in the pump outlet;
   (d) comparing the liquid pressure in the pump inlet with the liquid pressure in the pump outlet;
   (e) utilizing the pressure difference between said liquid pressures for controlling said valve in said conduit in such a way that said pressure difference is maintained within predetermined limits.

* * * * *